April 10, 1934.  H. T. PLATZ  1,954,427
WELDING APPARATUS
Original Filed Nov. 9, 1931
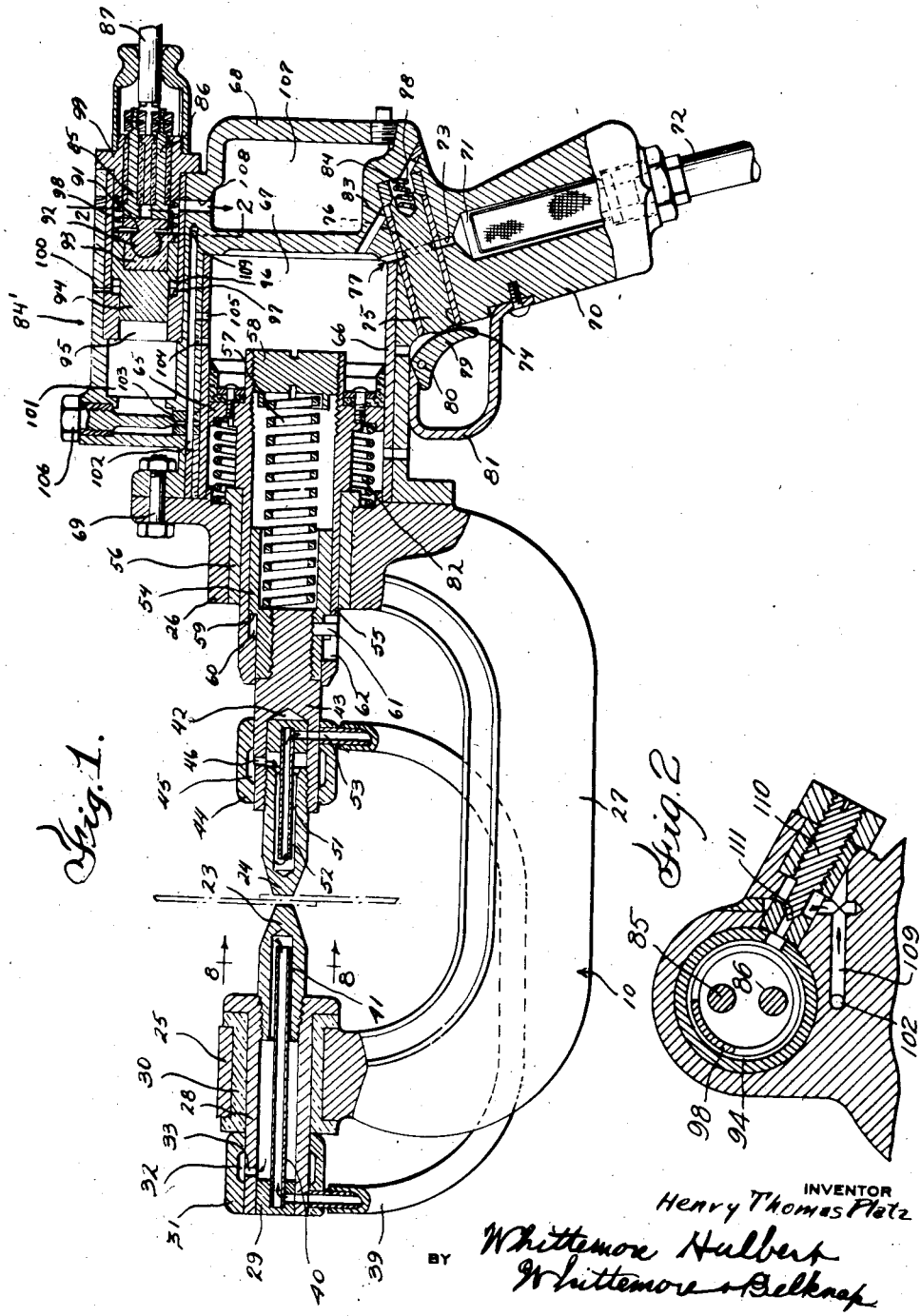
INVENTOR
Henry Thomas Platz
BY Whittemore Hulbert
Whittemore & Belknap
ATTORNEYS Patented Apr. 10, 1934

1,954,427

UNITED STATES PATENT OFFICE 1,954,427

WELDING APPARATUS

Henry Thomas Platz, Detroit, Mich., assignor to Briggs Manufacturing Company, Detroit, Mich., a corporation of Michigan Original application August 18, 1931, Serial No. 476,127. Divided and this application November 9, 1931, Serial No. 573,970. Renewed January 18, 1934

7 Claims. (Cl. 200—82)

This invention relates to welding apparatus and has as one of its objects to simplify, render more efficient and improve generally devices of this character.

This application is a division of my copending application Serial No. 476,127 filed August 18, 1931, entitled Welding apparatus.

The invention contemplates the provision of welding apparatus having relatively movable electrodes engageable with the parts to be welded and having means controlled by relative movement of the electrodes into operative position for automatically closing an electric circuit to the electrodes to perform the welding operation.

Another object of this invention is to provide welding apparatus of the type outlined above wherein relative movement of the electrodes into operative position and wherein opening and closing the electric circuit to the electrodes is automatically effected in timed relation to the movement of the electrodes by fluid pressure, thereby reducing the number of parts and as a consequence the cost of manufacture to a minimum.

Another advantageous feature of this invention is to provide means for variably controlling the fluid pressure for actuating the circuit controlling means so as to permit accurately regulating the length of the weld.

A further advantageous feature of the present invention resides in the provision of a pair of relatively movable electrodes engageable with opposite sides of the work and designed to yieldably clamp the latter therebetween. With the above arrangement, it will be apparent that the electrodes will automatically adjust themselves to accommodate work of varying dimension and also that the pressure exerted upon the work by the electrodes is maintained substantially constant during the welding operation or as the metal parts to be welded or fused together.

In the drawing

Figure 1 is a longitudinal sectional view through a welding device constructed in accordance with this invention, and Figure 2 is a sectional view taken substantially on the plane indicated by line 2—2 of Figure 1.

Referring now more in detail to the operation and particular construction of the welding device 10, it will be noted from the drawing that this device comprises a pair of cooperating opposed relatively movable electrodes 23 and 24 supported in axial alignment with each other in the legs 25 and 26, respectively, of a substantially U-shaped frame member 27. The electrode 23 is threadedly mounted within the inner end of a sleeve 28 extending through an opening in the leg 25 and closed at the outer end thereof by means of a plug 29. The sleeve 28 is anchored within and insulated from metallic contact with the leg 25 by means of a sleeve 30 surrounding the sleeve 28 and formed of any suitable insulating material. The outer end of the sleeve 28 preferably projects beyond the leg 25 and is adapted to receive a ring 31 having a recess 32 therein intermediate the ends thereof communicating with the interior of the sleeve 28 by means of a suitable passage 33. The ring 31 is provided with a lateral extension 34 having a passage 35 therein communicating with the recess 32 and also with a conduit 36 extending axially through the electric conductor 37 which is preferably formed of a plurality of electric wires 38 and is connected to the transformer (not shown). The electric wires 38 are adapted to contact with the extension 34 and supply electrical energy through the ring 31 and sleeve 28 to the electrode 23. As shown, the plug 29, sleeve 28 and ring 31 are provided with aligned passages establishing communication between a flexible tube 39 and a metallic tube 40 having the outer end thereof anchored within the plug 29 and extending axially through the sleeve 28 within a counterbored portion 41 of the electrode 23. The tube 39 is preferably connected to a suitable source of cooling medium with the result that the latter is caused to flow through the flexible tube 39 into the tube 40 and into the electrode 23 for cooling the latter. In this connection it is to be noted that the diameter of the tube 40 is considerably less than the passage 41 within the electrode 23 so as to permit the cooling medium to flow from the inner end of the tube 40 outwardly through the recess 41 and sleeve 28 to the recess 32 in the ring 31. From the recess 32 the cooling medium is directed through the passage 35 in the extension 34 into the tube 36 where it may be disposed of in any suitable manner.

The electrode 24 is supported by the leg 26 of the frame 27 for movement relative to the electrode 23 and, as will be observed, is threadedly mounted within the outer end of a recess 42 formed in the corresponding end of a plug 43 having a ring 44 encircling the outer end portion thereof and provided with an internal annular recess 45 communicating by means of the passage 46 in the recessed portion of the plug 43 with the recess 42 in the latter. The ring 44 is provided with a lateral extension 47 having a passage 48 therethrough communicating at one end with the annular recess 45 in the ring 44 and at the opposite end with a flexible tube 49 extending axially through the conductor 50 similar in construction to the conductor 37 but extending from the opposite side of the circuit. The conductor 50 is connected into the transformer 21 at one end and is electrically connected to the extension 47 at the opposite end so as to establish an electrical connection with the electrode 24. The flexible tube 49 preferably extends from the transformer cooling circulatory system so as to convey the cooling medium into the recess 42 through the various passages previously described. After the cooling medium is deposited within the recess 42, it is caused to flow through a recess 51 formed in the electrode 24 to cool the same. The cooling medium is then permitted to flow through a tube 52 arranged within the recess 51 and communicating with the flexible tube 39 by means of the passage 53. From the flexible tube 39 the cooling medium is discharged into the electrode 23 as previously described.

Threadedly mounted upon the inner end of the plug 43 is a sleeve 54 slidably engaging within a sleeve 55 which in turn is reciprocably mounted within a bushing 56 anchored within an opening formed in the leg 26 of the U-shaped frame 27. Arranged within the sleeves 54 and 55 is a spring 57 having the outer end thereof engaging the plug 43 and the inner end engaging a closure member 58 threadedly mounted within the inner end of the sleeve 55. The spring 57 normally urges the plug 43 and accordingly the electrode 24 to their outermost positions which is limited by engagement of the cooperating shoulders 59 and 60 on the sleeves 54 and 55, respectively. In this connection it is to be noted that the sleeve 54 is provided with a pin 61 engageable in a slot 62 formed in the sleeve 55. The slot is of sufficient length to permit the required relative movement of the parts and the side walls thereof engages opposite sides of the pin so as to hold the sleeves 54 and 55 while assembling or removing the plug. With the above construction, it will be apparent that the electrode 24 yieldably clamps the work against the electrode 23 with the result that the clamping pressure exerted by the electrode 24 is maintained substantially constant as the parts to be welded are fused together. It will further be seen that by reason of the above construction the electrodes will automatically compensate for work of varying dimensions. The clamping force of the electrode 24 may be accurately controlled by adjusting the closure member 58 relative to the sleeve 55 to change the length of the spring 57.

For actuating the sleeve 55 to effect a movement of the electrode 24 to operative position, the inner end portion of the sleeve 55 is provided with a radially outwardly extending circular flange 65 slidably engaging the annular side walls 66 of a suitable cylinder 67 and cooperating with the closure member 58 to form a piston. The cylinder 67 is formed within a casting 68 secured as at 69 to the leg 26 of the U-shaped frame 27. The casting 68 is further provided with a downwardly extending hand gripping portion 70 having a recess 71 therein communicating at the lower end thereof with a fluid supply line 72 and at the upper end with a reduced passage 73 which in turn communicates with a transversely extending chamber 74. Reciprocably mounted within the chamber 74 is a valve member 75 having a restricted passage 76 therein adapted, in one position of the valve member, to register with the passage 73 and with a cooperating passage 77 leading into the fluid cylinder 67. Movement of the valve member 75 to register the passages outlined above is resisted by means of a spring 78 acting upon the valve member to normally urge the same outwardly from the chamber 74. The valve member 75 is manually actuated to register the passages 73, 76 and 77 by means of a trigger 79 pivoted as at 80 to the casting and protected by means of the guard 81.

The foregoing construction is such that when it is desired to move the electrode 24 in operative position, the operator merely actuates the trigger 79 to move the valve 75 to its innermost position at which time the passage 76 in the valve registers with the passages 73 and 77 permitting fluid under pressure to flow into the cylinder 67. When the pressure of the fluid in the cylinder 67 exceeds the pressure of the spring 82 which serves to return the piston to its innermost position within the cylinder, the piston or sleeve 55 and plug 43 will be moved outwardly as a unit to engage the electrode 24 with the work. In this connection it is to be noted that the electrode 24 engages the work to clamp the same to the electrode 23 before the piston reaches the end of its stroke with the result that the sleeve 55 continues to move outwardly until the shoulder of the flange 65 engages the end of the sleeve 56 at which time the spring 57 is compressed and the electrode is yieldably clamped into engagement with the work. Upon release of the trigger 79, the valve 75 is moved outwardly under the influence of the spring 78 preventing further flow of fluid into the cylinder 67 and opening the passage 83 communicating at one end with the cylinder and at the other end with a port 84 which in turn communicates with the atmosphere to relieve the pressure within the cylinder 67 and permit the piston to be returned to inoperative position under the influence of the spring 82. During inward movement of the sleeve 55 under the action of the spring 82, it will be observed that the shoulder 60 on the sleeve 55 will engage the shoulder 59 on the sleeve 54 to return the electrode 24 to its inoperative position.

As previously stated it is one of the objects of this invention to provide means for automatically closing the circuit to the electrodes 23 and 24 in timed relation to relative movement of the latter into clamping engagement with the work. For accomplishing the above result, I provide a fluid pressure operated switch 84' comprising a pair of contact members 85 and 86 respectively connected by means of the electrical conductors 87 to the control circuit of the welding device. Thus, it will be seen that before the welding operation can be accomplished, the pressure controlled switch 84' must be actuated to close the circuit to the electrodes 23 and 24. In order to accomplish this result in timed relation to the movement of the electrode 24 into clamping engagement with the work so that as soon as the electrode 24 is in operative position, the circuit to the electrodes will be automatically closed, I provide an electric terminal bridge member 91 designed to bridge the contacts 85 and 86 and universally mounted as at 92 within a suitable insulator block 93 which in turn is secured within the inner end of a piston 94 slidably engaging within a cylinder 95. The inner end portion or head of the piston 94 is of a greater diameter than the body portion of the piston and forms an annular shoulder 96 adapted to engage a corresponding shoulder 97 in the cylinder 95 when the piston is in its outermost or inoperative position. The piston is normally urged to its inoperative position or away from the contact points by a light spring 98 having the outer end engaging the piston and the inner end thereof engaging a suitable cap member 99. A suitable relief passage 100 is provided having the inner end thereof communicating with the cylinder adjacent the annular shoulder 97 and the outer end communicating with the atmosphere. The arrangement is such as to prevent the piston from building up a pressure in rear of the same during movement thereof to its inoperative position.

The cylinder 95 is arranged within a chamber 101 formed integral with the casting 68 to one side of the cylinder 67 and arranged in communication therewith in the following manner. Formed in the wall of the casting between the cylinders 67 and chamber 101 is a longitudinally extending passage 102 communicating at the outer end thereof with the chamber 101 by means of a passage 103 and communicating with the cylinder 67 adjacent the inner end at predetermined distances from the inner end thereof by means of a pair of longitudinally spaced passages 104 and 105. The passages 104 and 105 are normally sealed by the piston on the sleeve 55 so as to prevent the flow of fluid from the cylinder 67 into the chamber 101 through the passages establishing communication therebetween. The construction is such, however, that as the piston or sleeve 55 approaches its full stroke to move the electrode 24 into clamping engagement with the work, the passages 105 and 104 will be progressively opened permitting fluid under pressure to flow through the passages 102 and 103 into the chamber 65 behind the piston 94. As soon as the pressure of the fluid in rear of the piston 94 exceeds that of the coil spring 98, the piston 94 will be moved inwardly to bridge the contact pins 85 and 86 by the member 91. Bridging the contacts 85 and 86 by the member 91 closes the control circuit to close the circuit to the electrodes 23 and 24. From the foregoing it will be observed that the pressure operated switch 84' functions in timed relation to the relative movement of the electrodes into operative position. The time interval allowed to elapse between the operation of the switch 84' and electrodes may be accurately regulated by means of a needle valve member 106 threadedly engaging the chamber 101 and adapted to extend within the passage 103 to control the amount of fluid admitted to the chamber 101.

Another object of the present invention broadly set forth in the preamble of this specification resides in the provision of means for automatically opening the pressure controlled switch 84' at predetermined intervals to discontinue the weld irrespective of the position of the manually controlled valve member 75. In order to accomplish the above function, the casting 68 is formed with a second chamber 107 communicating by means of a passage 108 with the cylinder 95 at a point in advance of the piston 94. The chamber 107 receives fluid under pressure from the passage 102 by means of a passage 109 communicating at one end with the passage 102 and at the opposite end with the cylinder 95 in advance of the piston 94 with the result that fluid under pressure flowing through the passages 102 and 109 will be discharged into the cylinder 95 in advance of the piston 94 and from the cylinder 95 will flow into the chamber 107 through the passage 108. Fluid will be discharged from the cylinder 67 to the chamber 107 through the path outlined above until the pressure in the chamber 107 is substantially equal to the pressure in the cylinder 67 or in other words, is substantially equal to the pressure behind the piston 95, at which time the piston 95 will be moved outwardly owing to the increased area of the outer end thereof and to the slight pressure exerted by the coil spring 98 to disconnect the contact pins 85 and 86 and thereby open the circuit to the electrodes 23 and 24. The time interval required to build up sufficient pressure in the chamber 107 for opening the circuit as outlined above and accordingly the length of the weld, may be accurately regulated by means of a needle valve 110 threadedly engaging the casting 68 and having a tapered end part 111 for controlling the flow of fluid from the passage 102 into the portion of the cylinder 95 in advance of the piston 94.

Thus, from the foregoing it will be apparent that I have provided a welding device having means automatically operable in timed relation to the movement of the electrodes into engagement with the work to be welded for closing the electric circuit to the electrodes and having additional means operable in timed relation to both of the aforesaid means for automatically opening the circuit to discontinue the weld. It will further be apparent that both of the aforesaid means may be accurately regulated to control the time intervals adapted to elapse between the closing and opening of the circuit to the electrodes.

What I claim as my invention is:

1. A fluid pressure operated switch for a portable welding device comprising, a pair of contact elements connected within an electric circuit and insulated from each other, a terminal bridge member for bridging the contact elements to close the circuit, a piston connected to the bridge member, a cylinder within which said piston is adapted to reciprocate and communicating at a point in rear of the piston with a source of fluid supply, yieldable means normally urging said piston and bridge member away from the contact elements, means for discharging fluid under pressure in rear of the piston to urge the same forwardly to electrically connect the contact elements with the bridge member for closing the circuit, and means for regulating the flow of fluid into said cylinder for regulating the time of operation of the piston.

2. A fluid pressure operated switch comprising a pair of insulated contact members connected to opposite sides of an electric circuit, a terminal member for bridging the contacts to close the circuit, a cylinder, a piston reciprocably mounted within the cylinder and connected at the forward end thereof to said terminal member, a fluid pressure chamber communicating with the cylinder in advance of the piston, means for discharging fluid under pressure in rear of the piston to move the latter and terminal bridge member into operative relation with the contact elements for closing the circuit, and means for simultaneously discharging fluid under pressure into said chamber for building up a pressure in advance of the piston for returning the latter and terminal member to inoperative position irrespective of the pressure in the cylinder in rear of the piston.

3. A fluid pressure operated switch comprising a pair of insulated contact members connected to opposite sides of an electric circuit, a terminal member for bridging the contacts to close the circuit, a cylinder, a piston reciprocably mounted within the cylinder and connected at the forward end thereof to said terminal member, a fluid pressure chamber communicating with the cylinder in advance of the piston, means for discharging fluid under pressure in rear of the piston to move the latter and terminal bridge member into operative relation with the contact elements for closing the circuit, means for simultaneously discharging a fluid under pressure into said chamber to build up a pressure in advance of the piston, and means automatically operable when the pressure in the chamber reaches a predetermined amount to return the piston and terminal member to inoperative position.

4. A fluid pressure operated switch comprising a pair of insulated contact members connected to opposite sides of an electric circuit, a terminal member for bridging the contacts to close the circuit, a cylinder, a piston reciprocably mounted within the cylinder and connected at the forward end thereof to said terminal member, a fluid pressure chamber communicating with the cylinder in advance of the piston, means for discharging fluid under pressure in rear of the piston to move the latter and terminal bridge member into operative relation with the contact elements for closing the circuit, means for simultaneously discharging fluid under pressure into said chamber for building up a pressure in advance of the piston for returning the latter and terminal member to inoperative position irrespective of the pressure in the cylinder in rear of the piston, and means for controlling the flow of fluid into said chamber and into the cylinder for regulating the operation of the piston and terminal contact member.

5. A pressure operated switch comprising a pair of insulated contact elements connected to opposite sides of a circuit, a terminal member adapted to bridge the contact elements to close the circuit, a piston operatively connected to the terminal bridge member, a cylinder within which said piston is reciprocably mounted, means for discharging fluid under pressure into the cylinder in rear of the piston to move the latter and terminal member into operative relation with the contact elements to close the circuit, means for simultaneously building up a pressure in advance of the piston operable to move the latter and terminal member to inoperative position irrespective of the fluid pressure in rear of the piston, and means for regulating the time interval required to build up sufficient pressure in advance of the piston to move the latter to inoperative position.

6. A fluid pressure operated switch comprising a pair of insulated contact elements connected to opposite sides of an electric circuit, a terminal bridge member adapted to establish an electrical connection between the contact elements to close the circuit, a piston operatively connected to the terminal member, a cylinder within which said piston is adapted to reciprocate, yieldable means normally urging said piston and terminal member to inoperative position, means for discharging fluid under pressure in rear of the piston to move the latter and terminal member carried thereby in operative position with the contact elements to close the circuits, and means for building up a pressure in advance of the piston substantially equal to the pressure discharged in rear of the piston permitting said yieldable means to return the piston and terminal member to inoperative position.

7. A fluid pressure operated switch for use in connection with an electric welding device comprising, a pair of contacts arranged in the control circuit of the welding device, a circuit closer engageable with said contacts, a piston for actuating said circuit closer, a cylinder for said piston, a passage connecting said cylinder to a source of fluid pressure supply, spring means normally urging said piston in one direction to hold said circuit closer out of engagement with said contacts, the fluid pressure from said source of fluid supply acting to move said piston in the opposite direction, and a metering valve in said passage for regulating the flow of pressure fluid into said cylinder whereby the time interval required to operate said piston to close the circuit may be regulated.

HENRY THOMAS PLATZ.